UNITED STATES PATENT OFFICE 2,036,186

SULPHURIZED DYESTUFFS AND PROCESS OF MAKING SAME

André Catineau, St. Fons, near Lyon, France, and Ernst Dür, Basel, Switzerland, assignors to the firm of Society of Chemical Industry in Basle, Basel, Switzerland No Drawing. Application May 9, 1934, Serial No. 724,824. In Switzerland May 17, 1933

15 Claims. (Cl. 260—19)

It is known that dyestuff mixtures consisting, on the one part, of products which are preferably dyed according to the manner used for sulphurized dyestuffs, i. e. from a sodium sulphide bath, and, on the other part, from products which are best dyed according to the method used for vat-dyestuffs, i. e. from baths containing hydrosulphite, are obtained by sulphurizing the indophenols from carbazoles and nitrosophenols.

It is further known that by a suitable alteration of the conditions of the sulphurization, the sulphurization of the said indophenols or of the leuco-indophenols obtainable therefrom by reduction, can be carried out in such a manner that products of the type of the vat-dyestuffs are exclusively obtained. Such a process is for example the process of Patent No. 1,695,756, according to which indophenols or leuco-indophenols from carbazoles and nitrosophenols are sulphurized at temperatures of about 180–205° C. in the presence of aromatic amines, for instance, among others, 1-aminobenzene, 1-amino-4-nitrobenzene, 1-acetylamino-4-aminobenzene, and diphenylamine.

Applicants have now made the surprising observation that, when choosing, on the one hand, a higher temperature of the sulphurization than is indicated in the above patent, for instance 210–250° C., and, on the other hand, using as additions such nuclear substitution products of the aminobenzene which, when sulphurized alone, yield yellow to brown sulphur dyestuffs, there are no longer obtained products resembling vat-dyestuffs, but blue to black dyeing sulphur dyestuffs capable of being dyed from a sodium sulphide bath, the dyeings on cotton being characterized by excellent fastness properties, particularly very good fastness to chlorine. As nuclear substitution products of the 1-aminobenzene which when sulphurized alone lead to yellow to brown dyestuffs of the thiazine, azine or thiazol series, there may particularly be mentioned amino compounds containing a substituent of the general formula $$x—R$$

wherein R represents hydrogen, alkyl, aralkyl or aryl, and $x$ stands for a bridge consisting of a nitrogen atom bound to a carbon atom in which the N-atom is bound to the benzene nucleus and in which the carbon atom is bound to the radical R, which substituent is converted in the sulphurization into a thiazol nucleus according to the following scheme:—

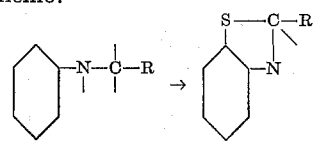

Such products are, for example, the monoacyl derivatives of the diamino benzenes and the conversion products thereof, such as, for instance, acetyl-para-phenylenediamine, acetyl-meta-phenylenediamine, acetyl-meta-toluylenediamine, further the corresponding compounds wherein the acetyl group has been replaced by another acyl group, for example, the formyl, propionyl, butyl or benzoylamino group. There may also be used such compounds which in place of the amino group contain such a group whose effect in the sulphurization is equal to an amino group. Such products are, for example, 4-nitro-1-acetylaminobenzene, 4-hydroxy-1-acetylaminobenzene, 4-nitro-2-methyl-1-acetylaminobenzene. Further there may be used products such as 4-amino-3-methyl-1-acetylaminobenzene, 1-aminoazobenzene, 1-aminonaphthalene-4-azobenzene and so forth. Valuable results are also obtained by using, for example, aminobenzene compounds containing the group $$—N=C—R$$

wherein R represents hydrogen, alkyl, aralkyl or aryl, i. e. residues of Schiffs' bases. As is known, these products also yield thiazol derivatives when heated with sulphur. Such products are, for example, the compounds which are formed by condensing nitranilines with benzaldehyde and subsequently reducing the nitro group, or by condensing aminoaldehydes with aromatic amines, as well as the products which are formed from 1 mole para-phenylenediamine and one or two moles para-aminobenzaldehyde. To the additions belong further such products which can be regarded as derivatives of the above named acidyl or anhydro compounds, such as imidazoles and aldehydines, for example, μ-methyl-4-amino-1:2-benzene-imidazole.

It is highly probable that in the sulphurization condensation between the leuco-indophenol and the 1-aminobenzene derivatives first takes place, and sulphurization with formation of the sulphur dyestuff occurs only afterwards. In accordance with this process it has also been established that the products of the present application can be obtained more uniformly if the formation of the condensation product and the formation of the sulphur dyestuff does not occur during the sulphurization, but temporarily separated from one another in such a way that first of all the condensation product is produced in a separate operation which is subsequently heated with sulphur at the said temperature range. The condensation products are prepared in known manner by condensing the corresponding indophenols with the nuclear substitution product of 1-aminobenzene suitable for carrying out the present process.

The new products represent blue to black dyestuffs fast to light and chlorine. In accordance with their synthesis they contain in their molecule the same atom skeleton as a leuco-indophenol of the formula

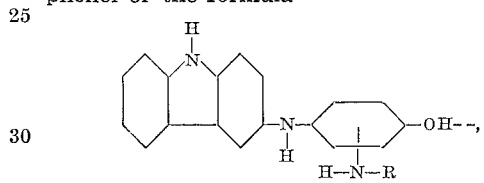

wherein R is a substituted benzene radical. They represent dark to black powders dissolving in sodium sulphide to a yellow-green solution and in sulphuric acid to a blue-green solution. They may not only be dyed from a bath containing sodium sulphide but also from a bath containing sodium hydrosulphite. As mentioned above, the best dyeings are obtained when the dyeing is carried out in accordance with the method used for sulphur dyestuffs. In that case they yield blue to black dyeings which are fast to chlorine, washing and light.

The following examples illustrate the invention without, however, limiting its scope. The parts are by weight, unless otherwise stated.

*Example 1*

16.7 parts of carbazole are condensed in known manner with 14.5 parts of para-nitrosophenol; the indophenol produced is isolated by introducing the mass into ice-water and filtering. It is reduced by treatment with a polysulphide solution, prepared from 35 parts of crystallized sodium sulphide and 14.5 parts of sulphur. After the reduction there are added to the mass 8 parts of 1-acetylamino-4-aminobenzene, 15.5 parts of sulphur and 10 parts of common salt. The whole is now dried and heated at 210–215° C. until no more hydrogen sulphide is evolved. The mass thus obtained is finely pulverized, introduced into 2 litres of water and oxidized with air, until no more dissolved dyestuff can be detected. The dyestuff thus obtained, which represents a dark powder, dissolves in sodium sulphide to a yellow-green solution and dyes cotton fast black tints, particularly fast to chlorine. It dissolves in concentrated sulphuric acid to a blue-green solution. When substituting the corresponding 3-amino-benzene compound for the 1-acetylamino-4-aminobenzene, there is obtained a blue-black dyeing dyestuff.

*Example 2*

The indophenol made as described in Example 1 is reduced in a mixture of 29 parts of sodium sulphide and 12 parts of sulphur. After addition of 14 parts of 1-acetylamino-4-aminobenzene, 23 parts of sulphur and 10 parts of common salt, the mass is dried, ground and heated to 230–240° C. until there is no further evolution of hydrogen sulphide. The mass thus obtained is finely ground and introduced into 2 litres of warm water and acidified with dilute sulphuric acid. The completely separated dyestuff is filtered and dried. It represents a black powder possessing the same properties as the dyestuff obtained in Example 1.

*Example 3*

27.3 parts of the indophenol from carbazole and nitrosophenol are thoroughly stirred with a sodium tetrasulphide, obtained from 30 parts of crystallized sodium sulphide and 12 parts of sulphur, reduction taking place thereby. The whole is then thoroughly mixed with 14 parts of 1-amino-4-formylaminobenzene, 18 parts of sulphur and 10 parts of common salt. The mass is dried in the vacuum at 80–85° C., pulverized and baked for 2 hours at 230° C. The fused mass is then ground, well stirred with 700 parts of water of 80° C. and made neutral, whereupon the black-dyeing sulphur dyestuff is separated by filtration, washed and dried. After grinding there is obtained a black powder dissolving in concentrated sulphuric acid to a blue-green solution and in sodium sulphide to a yellow-green solution, and dyeing cotton from a sodium sulphide bath black tints.

A similar product is obtained when substituting $\mu$-methyl-4-amino-1:2-benzimidazole for the 1-amino-4-formylaminobenzene.

*Example 4*

27.3 parts of carbazole-indophenol are thoroughly stirred with 500 parts by volume of water. To this mixture there is added a solution of 15 parts of 1-amino-4-acetylaminobenzene dissolved in 300 parts by volume of water, and the whole is acidified with acetic acid.

The mixture is now heated to 60° C. while stirring, condensation taking place within 2–3 hours. The end of the reaction is ascertained by the fact that a spot test with alcohol does no longer show the violet solution of the indophenol but indicates that a red-brown compound, difficultly soluble in alcohol, has been formed. As soon as this point is attained the whole is filtered, washed with hot water, and the moist condensation product intimately mixed with a tetrasulphide from 30 parts of crystallized sodium sulphide and 12 parts of sulphur, as well as with 18 parts of sulphur and 10 parts of common salt, and dried in the vacuum at 80–85° C. The dry pulverized mixture is then baked for about 2 hours at 230° C. The finely ground fused mass is stirred into 700 parts of water at 80° C., neutralized with dilute acid and filtered. The thoroughly washed dyestuff is then dried. It possesses the properties of the product obtained in Example 1, but the fastness to washing is better still.

Similar results are obtained when substituting 1-amino-3-acetylaminobenzene or 1-amino-2-methyl-5-acetylaminobenzene for the 1-amino-4-acetylaminobenzene.

Black dyeing dyestuffs are also obtained by using 1-amino-4-benzoylaminobenzene, 1-amino-3-formyl-aminobenzene, 1-amino-4-formylaminobenzene, μ-methyl-4-amino-1:2-benzimidazole, 4-aminodiphenyl urea or the like instead of 1-amino-4-acetylaminobenzene.

*Example 5*

27.3 parts of carbazole-indophenol are suspended in 50 parts by volume of alcohol and then mixed with a solution consisting of 10 parts of the condensation product from 1 mole of 1:4-diaminobenzene and 2 moles of 4-aminobenzaldehyde in about 100 parts by volume of alcohol. The whole is made weakly acetic with acetic acid and stirred for 4 hours at 60° C. After this time the condensation is complete. By introducing the condensation product into about 500 parts of water it is precipitated as a grey-brown flocculent mass. The latter is separated by filtration, thoroughly washed with hot water, dried in the vacuum with sodium tetrasulphide, sulphur and common salt, analogously to the data of Example 3, and baked for 2 hours at 230° C. There is obtained a black-dyeing dyestuff which dissolves in sulphuric acid to a blue-green solution and in sodium sulphide to a yellow-green solution.

What we claim is:—

1. Process for the manufacture of blue to black dyeing sulphur dyestuffs, comprising first condensing indophenols from carbazoles and nitrosophenols with such nuclear substitution products of 1-aminobenzene which, when sulphurized alone, yield yellow to brown dyestuffs, and then heating the condensation products thus obtained with sulphur at temperatures above 210° C.

2. Process for the manufacture of blue to black dyeing sulphur dyestuffs, comprising first condensing indophenols from carbazole and nitrosophenols with such nuclear substitution products of 1-aminobenzene which are substituted in 3- or 4-position to the amino group by a substituent of the general formula $$x—R,$$

wherein $x$ represents a bridge consisting of a nitrogen atom bound to a carbon atom, whose N-atom is bound to the benzene nucleus and whose carbon atom is bound to the radical R, and then heating the condensation products thus obtained with sulphur at temperatures above 210° C.

3. Process for the manufacture of blue to black dyeing sulphur dyestuffs, consisting in first condensing the indophenol from carbazole and nitrosophenol with such nuclear substitution products of 1-aminobenzene which contain an acylamino group in 3- or 4-position to the amino group, and then heating the condensation products thus obtained with sulphur at temperatures above 210° C.

4. Process for the manufacture of blue to black dyeing sulphur dyestuffs, consisting in first condensing the indophenol from carbazole and nitrosophenol with such nuclear substitution products of 1-aminobenzene which contain an acylamino group in 4-position to the amino group, and then heating the condensation products thus obtained with sulphur at temperatures above 210° C.

5. Process for the manufacture of blue to black dyeing sulphur dye-stuffs, comprising condensing the indophenol from carbazole and nitrosophenol with 1-amino-4-acetylaminobenzene, and then heating the condensation product thus obtained with sulphur at temperatures above 210° C.

6. The blue to black dyeing sulphur dyestuffs fast to light and chlorine containing in their molecule the same atom skeleton as a leuco-indophenol of the formula

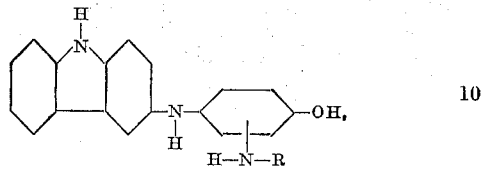

wherein R represents a substituted benzene radical, which can be obtained by heating with sulphur at temperatures above 210° C. the condensation products obtainable by condensing indophenols from carbazoles and nitrosophenols with such nuclear substitution products of 1-aminobenzene which, when sulphurized alone, yield yellow to brown dyestuffs, which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

7. The blue to black dyeing sulphur dyestuffs fast to light and chlorine containing in their molecule the same atom skeleton as a leuco-indophenol of the formula

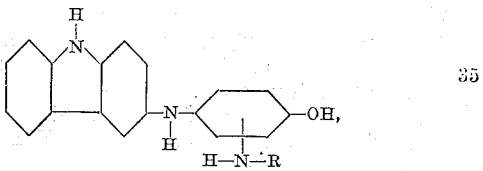

wherein R represents a substituted benzene radical, which can be obtained by heating with sulphur at temperatures above 210° C. the condensation products obtainable by condensing the indophenol from carbazole and nitrosophenol with such nuclear substitution products of 1-aminobenzene which, when sulphurized alone, yield yellow to brown dyestuffs, which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

8. The blue to black dyeing sulphur dyestuffs fast to light and chlorine containing in their molecule the same atom skeleton as a leuco-indophenol of the formula

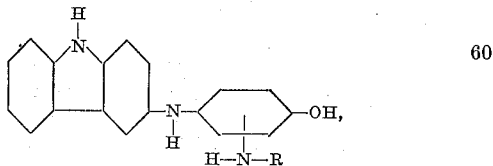

wherein R represents a substituted benzene radical, which can be obtained in a particularly pure form by first condensing indophenols from carbazoles and nitrosophenols with such nuclear substitution products of 1-aminobenzene which, when sulphurized alone, yield yellow to brown dyestuffs, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

9. The blue to black dyeing sulphur dyestuffs fast to light and chlorine containing in their molecule the same atom skeleton as a leuco-indophenol of the formula

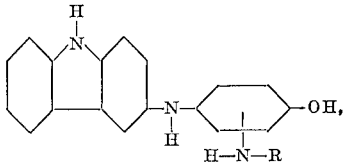

wherein R represents a substituted benzene radical, which can be obtained in a particularly pure form by first condensing indophenols from carbazoles and nitrosophenols with such nuclear substitution products of 1-aminobenzene which are substituted in 3- or 4-position to the amino group by a substituent of the general formula $$x-R,$$

wherein $x$ represents a bridge consisting of a nitrogen atom bound to a carbon atom, whose N-atom is bound to the benzene nucleus and whose carbon atom is bound to the radical R, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

10. The blue to black dyeing sulphur dyestuffs fast to light and chlorine containing in their molecule the same atom skeleton as a leuco-indophenol of the formula

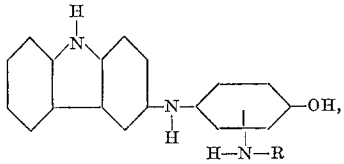

wherein R represents a substituted benzene radical, which can be obtained in a particularly pure form by first condensing the indophenol from carbazole and nitrosophenol with such nuclear substitution products of 1-aminobenzene which are substituted in 3- or 4-position to the amino group by a substituent of the general formula $$x-R,$$

wherein $x$ represents a bridge consisting of a nitrogen atom bound to a carbon atom, whose N-atom is bound to the benzene nucleus and whose carbon atom is bound to the radical R, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

11. The blue to black dyeing sulphur dyestuffs fast to light and chlorine containing in their molecule the same atom skeleton as a leuco-indophenol of the formula

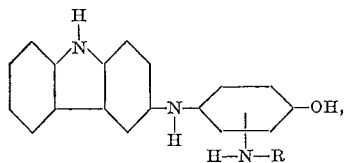

wherein R represents a substituted benzene radical, which can be obtained in a particularly pure form by first condensing indophenols from carbazoles and nitrosophenols with such nuclear substitution products of 1-aminobenzene which contain an acylamino group in 3- or 4-position to the amino group, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

12. The blue to black dyeing sulphur dyestuffs fast to light and chlorine containing in their molecule the same atom skeleton as a leuco-indophenol of the formula

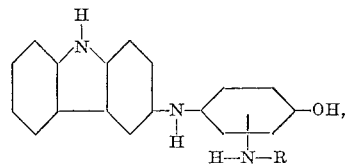

wherein R represents a substituted benzene radical, which can be obtained in a particularly pure form by first condensing the indophenol from carbazole and nitrosophenol with such nuclear substitution products of 1-aminobenzene which contain an acylamino group in 3- or 4-position to the amino group, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary to sulphur dyestuffs.

13. The blue to black dyeing sulphur dyestuffs fast to light and chlorine containing in their molecule the same atom skeleton as a leuco-indophenol of the formula

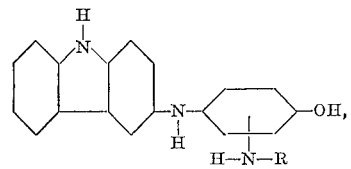

wherein R represents a substituted benzene radical, which can be obtained in a particularly pure form by first condensing indophenols from carbazoles and nitrosophenols with such nuclear substitution products of 1-aminobenzene which contain an acylamino group in 4-position to the amino group, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tins fast to chlorine, washing and light when dyed according to the manner customary for sulphur dyestuffs.

14. The blue to black dyeing sulphur dyestuffs fast to light and chlorine containing in their molecule the same atom skeleton as a leuco-indophenol of the formula

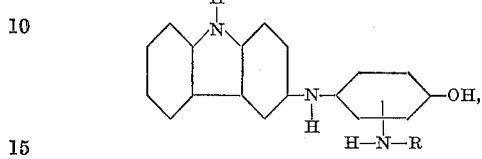

wherein R represents a substituted benzene radical, which can be obtained in a particularly pure form by first condensing the indophenol from carbazole and nitrosophenol with such nuclear substitution products of 1-aminobenzene which contain an acylamino group in 4-position to the amino group, and then heating the condensation products thus obtained with sulphur at temperatures above 210° C., which dyestuffs form dark to black powders dissolving in sodium sulphide to yellow-green and in concentrated sulphuric acid to blue-green solutions, and dyeing cotton blue to black tints fast to chlorine, washing and light when dyed according to the manner customary for sulphur dyestuffs.

15. The black dyeing sulphur dyestuff fast to light and chlorine containing in its molecule the same atom skeleton as a leuco-indophenol of the formula

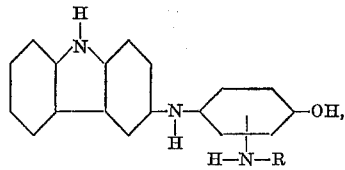

wherein R represents a substituted benzene radical, which can be obtained in a particularly pure form by first condensing the indophenol from carbazole and nitrosophenol with 1-amino-4-acetylaminobenzene, and then heating the condensation product thus obtained with sulphur at temperatures above 210° C., which dyestuff forms a black powder dissolving in sodium sulphide to yellow-green and in concentrated sulphuric acid to blue-green solutions, and dyeing cotton black tints fast to chlorine, washing and light when dyed according to the manner customary for sulphur dyestuffs.

ANDRÉ CATINEAU.
ERNST DÜR.